US011479283B2

(12) United States Patent
Luehrs et al.

(10) Patent No.: US 11,479,283 B2
(45) Date of Patent: Oct. 25, 2022

(54) METHOD FOR OPERATING A TRACK-BOUND TRAFFIC SYSTEM

(71) Applicant: SIEMENS MOBILITY GMBH, Munich (DE)

(72) Inventors: Peter Luehrs, Braunschweig (DE); Karsten Rahn, Cremlingen (DE); Oscar Alonso Garrido, Tres Cantos (ES)

(73) Assignee: Siemens Mobility GmbH, Munich (DE)

( * ) Notice: Subject to any disclaimer, the term of this patent is extended or adjusted under 35 U.S.C. 154(b) by 401 days.

(21) Appl. No.: 16/622,432

(22) PCT Filed: May 14, 2018

(86) PCT No.: PCT/EP2018/062282
§ 371 (c)(1),
(2) Date: Dec. 13, 2019

(87) PCT Pub. No.: WO2018/228758
PCT Pub. Date: Dec. 20, 2018

(65) Prior Publication Data
US 2020/0101992 A1    Apr. 2, 2020

(30) Foreign Application Priority Data

Jun. 13, 2017  (DE) .................... 10 2017 209 926.7

(51) Int. Cl.
*B61L 27/20*      (2022.01)
*B61L 3/12*       (2006.01)
(Continued)

(52) U.S. Cl.
CPC ............... *B61L 27/20* (2022.01); *B61L 3/121* (2013.01); *B61L 3/125* (2013.01); *B61L 23/14* (2013.01);
(Continued)

(58) Field of Classification Search
CPC ...... B61L 25/025; B61L 25/023; B61L 27/70; B61L 2027/202; B61L 2205/00; B61L 3/121; B61L 1/16; B61L 1/18
See application file for complete search history.

(56) References Cited

U.S. PATENT DOCUMENTS 5,036,478 A * 7/1991 MacDougall ............. B61L 1/16
                                                  702/158
5,803,411 A * 9/1998 Ackerman .............. B61L 3/121
                                                   701/19
(Continued)

FOREIGN PATENT DOCUMENTS

CN      102069825 A     5/2011
CN      102387953 A     3/2012
(Continued)

OTHER PUBLICATIONS

Kirchner Werner et al: "ETCS Level 1 Limited Supervision-Migration von ETCS in die vorhandene Bahninfrastruktur", Signal+Draht, DVV, vol. 106, No. 7/08, pp. 29-34, XP001590263, ISSN: 0037-4997, the whole document; 2014.

*Primary Examiner* — Zachary L Kuhfuss
(74) *Attorney, Agent, or Firm* — Laurence A. Greenberg; Werner H. Stemer; Ralph E. Locher

(57) ABSTRACT

A method operates a track-bound traffic system which carries out a determination that a first track section part lying between a track-bound vehicle and a second track section is free of vehicles. A track-side device disposed in a first track section at a distance to an adjacent second track section, transmits status information which characterizes the second track section as being free of track-bound vehicles, and the transmitted status information is received by a vehicle traversing the first track section. The distance is measured such that no other track-bound vehicle fits in a first track section part lying between the track-bound vehicle and the
(Continued)

second track section when the track-bound vehicle receives the status information, and the first track section part lying between the track-bound vehicle and the second track section is identified as being free of other track-bound vehicles by the track-bound vehicle based on the received status information.

16 Claims, 1 Drawing Sheet

(51) Int. Cl.
    *B61L 23/34* (2006.01)
    *B61L 23/14* (2006.01)
    *B61L 27/04* (2006.01)

(52) U.S. Cl.
    CPC ........... *B61L 23/34* (2013.01); *B60L 2200/26* (2013.01); *B61L 27/04* (2013.01); *B61L 2027/202* (2022.01); *B61L 2027/204* (2022.01)

(56) References Cited

U.S. PATENT DOCUMENTS

| | | | |
|---|---|---|---|
| 9,669,853 B2* | 6/2017 | Kurita | B60L 15/40 |
| 10,457,300 B2 | 10/2019 | Rahn | |
| 11,124,212 B2* | 9/2021 | Moennich | B61L 23/042 |
| 11,124,213 B2* | 9/2021 | Schmidt | B61L 29/22 |
| 2014/0131524 A1 | 5/2014 | Grimm et al. | |
| 2014/0209755 A1* | 7/2014 | Takahashi | B61L 27/20 |
| | | | 246/167 R |
| 2014/0214248 A1* | 7/2014 | Yamada | B61L 23/34 |
| | | | 701/20 |
| 2015/0225003 A1 | 8/2015 | Morton | |
| 2018/0162427 A1 | 6/2018 | Driemel et al. | |
| 2019/0077432 A1* | 3/2019 | Itagaki | B61L 27/20 |
| 2019/0077433 A1* | 3/2019 | Itagaki | B61L 27/37 |
| 2019/0168791 A1* | 6/2019 | Guislain | B61L 1/162 |
| 2020/0207390 A1* | 7/2020 | Alonso Garrido | B61L 3/121 |

FOREIGN PATENT DOCUMENTS

| | | |
|---|---|---|
| CN | 104703858 A | 6/2015 |
| CN | 105292189 A | 2/2016 |
| CN | 105620518 A | 6/2016 |
| CN | 105946905 A | 9/2016 |
| CN | 106394610 A | 2/2017 |
| CN | 106564517 A | 4/2017 |
| CN | 106740989 A | 5/2017 |
| CN | 106741013 A | 5/2017 |
| DE | 102013226718 A1 | 6/2015 |
| DE | 102014218527 A1 | 3/2016 |
| DE | 102015204769 A1 | 9/2016 |
| DE | 102015210427 A1 | 12/2016 |
| EP | 1612118 A2 | 1/2006 |
| WO | 2012149761 A1 | 11/2012 |
| WO | 2015090932 A1 | 6/2015 |
| WO | 2015197286 A1 | 12/2015 |
| WO | WO2016198231 A1 | 12/2016 |

* cited by examiner

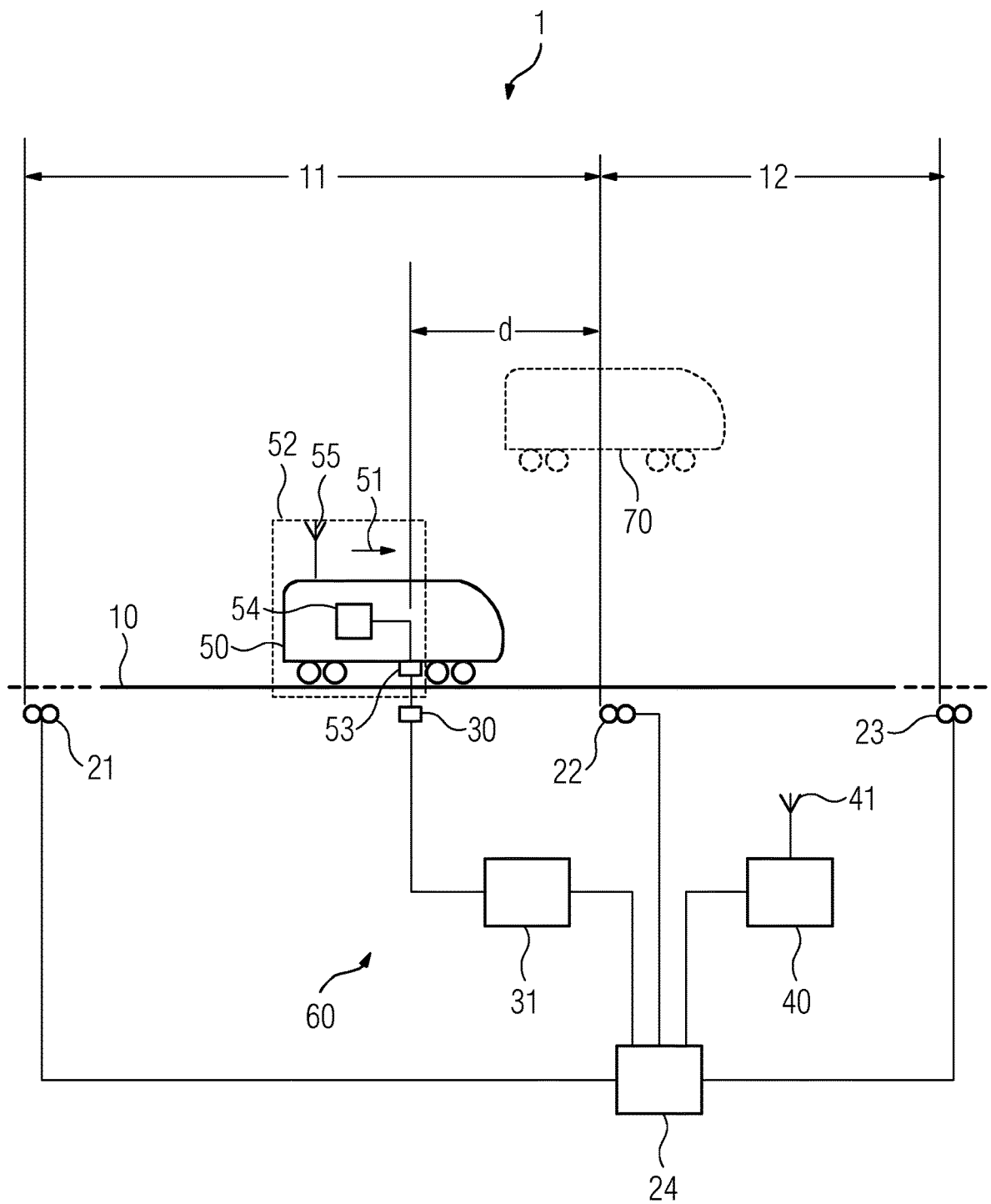

METHOD FOR OPERATING A TRACK-BOUND TRAFFIC SYSTEM

BACKGROUND OF THE INVENTION

Field of the Invention

Track-bound traffic systems generally make use of train control systems or automatic train protection systems in the course of operating the track-bound vehicles associated therewith, said vehicles being embodied as rail vehicles, magnetic levitation systems or even track-guided vehicles with rubber tires, for example. In the case of track-bound vehicles in the form of rail vehicles, an appropriate system may be a communications-based train control (CBTC) system, for example. In such a system, the detection of vehicles or trains in a region ahead of and/or behind the respective track-bound vehicle is fundamentally important in order to allow e.g. moving-block operation monitored by the automatic train protection system.

The relevant trains to be detected may generally include both trains that know their own position and report it to a is control device of the train control system and trains that do not. In the case of the latter "non-reporting trains", it is possible on one hand that the relevant track-bound vehicles are generally unaware of or unable to report their position. On the other hand, in the case of track-bound vehicles which normally know their position, the situation can arise in which the relevant track-bound vehicle is not able to specify or report its position due to e.g. a technical fault, e.g. the failure of a communication connection. As a consequence, depending on the respective situation and the respective conditions, it may be uncertain whether part of a first line section, said part lying between a track-bound vehicle and a second line section, is free of other track-bound vehicles or not.

SUMMARY OF THE INVENTION

The object underlying the present invention is to specify a method for operating a track-bound traffic system, whereby it is made possible in a way which is particularly efficient and can be realized with comparatively little expense to identify that part of a first line section, said part lying between a track-bound vehicle and a second line section, is free of other track-bound vehicles.

This object is inventively achieved by a method for operating a track-bound traffic system, wherein a lineside device which is located in a first line section at a distance from an adjacent second line section transmits status information characterizing the second line section as being free of track-bound vehicles, the transmitted status information is received by a track-bound vehicle traversing the first line section at the location of the lineside device, wherein the distance of the lineside device from the second line section is dimensioned such that when the status information is received by the track-bound vehicle, no other track-bound vehicle fits into that part of the first line section which lies between the track-bound vehicle and the second line section, and on the basis of the received status information, the track-bound vehicle identifies that part of the first line section which lies between the track-bound vehicle and the second line section is free of other track-bound vehicles.

According to the first feature of the inventive method for operating a track-bound traffic system, a lineside device which is located in a first line section at a distance from a second line section therefore transmits status information characterizing the second line section as being free of track-bound vehicles. In this case, it is ensured by means of corresponding measures that the status information characterizing the second line section as being free of track-bound vehicles is only transmitted by the lineside device if the second line section actually is free of track-bound vehicles. In this context, the lineside device and any further components involved in specifying the occupancy or vacancy state of the second line section are preferably embodied in a fail-safe manner in order to satisfy the high safety requirements of railway signaling systems.

According to the second step of the inventive method, the transmitted status information is received at the location of the lineside device by a track-bound vehicle traversing the first line section, wherein the distance of the lineside device from the second line section is dimensioned such that when the status information is received by the track-bound vehicle, no other track-bound vehicle fits into that part of the first line section which lies between the track-bound vehicle and the second line section. By means of the status information, the lineside device sends the track-bound vehicle information to the effect that the second line section is free of track-bound vehicles, i.e. unoccupied or vacant. By virtue of the track-bound vehicle receiving the status information at the location of the lineside device, it is ensured in this context that, at the instant at which the track-bound vehicle receives the status information, no other track-bound vehicle is located or "hidden" in that part of the first line section which lies between the lineside device and the second line section. This is ensured by means of dimensioning the distance of the lineside device that is located in the first line section from the second line section in such a way that when the status information is received by the track-bound vehicle, no other track-bound vehicle fits into that part of the first line section which lies between the track-bound vehicle and the second line section. This means that the distance between the lineside device and the adjacent second line section is so small that another track-bound vehicle located in the region would necessarily project into the second line section (or would already have collided with the track-bound vehicle). According to the invention, the position of the lineside device is selected and/or the method is executed in such a way that a corresponding other vehicle, even allowing for tolerances, latency times (e.g. in relation to identifying the second line section as occupied) and vehicle overhangs, would be detected as occupying the second line section.

According to the third feature of the inventive method, it is thereby possible for the track-bound vehicle to identify, specify or establish that, on the basis of the received status information, that part of the first line section which lies between the track-bound vehicle and the second line section is free of other track-bound vehicles. With regard to the course of action to be taken upon identifying or specifying the relevant part of the first line section is as being free of other track-bound vehicles, various courses of action are possible in this case.

It is thus conceivable on one hand for the track-bound vehicle to already be certain, simply as a result of receiving the status information, that that part of the first line section which lies between the lineside device and the second line section is free of other track-bound vehicles. This therefore assumes that corresponding status information is transmitted only by those lineside devices that are actually located at a distance from the second line section which is dimensioned such that when the status information is received by the track-bound vehicle, no other track-bound vehicle fits into that part of the first line section which lies between the track-bound vehicle and the second line section.

If this is not guaranteed, or optionally also as an additional safety check, it is further possible for the track-bound vehicle to perform an additional check in respect of the validity or applicability of the received status information. For example, an identity of the lineside device can be received from the lineside device and, on the basis of the received identity, the track-bound vehicle can then verify whether the relevant lineside device is actually able or allowed to be used for the method described. Additionally or alternatively, it is also conceivable for the track-bound vehicle to determine the position of the lineside device on the basis of the received identity with reference to e.g. an electronic line atlas, and to calculate the distance to the subsequent second line section and compare this distance with a reference value.

Irrespective of whether a corresponding further check is carried out by the track-bound vehicle, the received status information allows the track-bound vehicle to identify that that part of the first line section which lies between the lineside device and the second line section is free of other track-bound vehicles. This means that no other track-bound vehicle is located in the relevant part of the first line section. Said part of the first line section may be located ahead of or behind the track-bound vehicle as viewed in the direction of travel. The track-bound vehicle is therefore provided with information that the line which lies ahead or behind is free of other vehicles at least as far as the end of the second line section. This information can subsequently be used in the course of operating the track-bound traffic system, in particular in the context of controlling and safeguarding the track-bound vehicle and optionally further track-bound vehicles.

The method according to the invention has the fundamental advantage that that part of the first line section which lies between the lineside device and the second line section is identified as being free of other track-bound vehicles by the track-bound vehicle itself. Since a transfer of the status information from the lineside device to the track-bound vehicle can be effected almost without delay, the track-bound vehicle is made aware at essentially the moment it passes the lineside device that no other track-bound vehicles are located in that part of the first line section which lies between the lineside device and the second line section or in the adjoining second line section. The track-bound vehicle is therefore able correspondingly to take this situation into account without delay. In this context, the method according to the invention also has the particular advantage of being essentially independent of the respective speed of the track-bound vehicle, i.e. it functions just as well at comparatively high speeds as at comparatively low speeds.

It is further advantageous that a transfer of the position of the track-bound vehicle to a lineside control device is not required for the purpose of identifying that part of the first line section which lies between the lineside device and the second line section as being free of other track-bound vehicles. As an alternative to the method according to the invention, it would for example be conceivable in principle for the information relating to the current position of the track-bound vehicle and the occupancy state of the second line section to be combined at lineside. Owing to the radio communication that is usually used for corresponding communications between the track-bound vehicle and the corresponding lineside control device, a dependency on the speed of the track-bound vehicle would however arise due to the delay times which occur and which must be taken into consideration. In this case, the situation could therefore arise that at the instant at which the lineside control device receives from the track-bound vehicle a position which lies at a distance from the second line section, said distance being dimensioned such that when the status information is received by the track-bound vehicle, no other track-bound vehicle fits into that part of the first line section which lies between the track-bound vehicle and the second line section, the track-bound vehicle has already reached and therefore itself occupies the second line section. In this case, it would therefore be impossible to indicate whether other track-bound vehicles are located in the first and/or second line section. By comparison, the method according to the invention has the advantage that the track-bound vehicle receives the status information at the location of the lineside device and it is therefore guaranteed at the same instant that no other track-bound vehicle is located between the lineside device and the beginning of the second line section.

With regard to the source of the status information transmitted by the lineside device, it should be noted that modern communication-based systems for controlling and safeguarding traffic systems, e.g. in the form of CBTC systems, often include a vacancy detection system at least as a fallback level. The same can apply at system boundaries, e.g. to depots or lines using different automatic train protection systems, in order to allow trains at these system boundaries to be taken into the CBTC operation, for example. Corresponding vacancy detection systems can be advantageously used in the context of the inventive method, wherein the inventive method may be applied or deployed in special situations in particular, i.e. commencing train operation following a fault, for example.

In the event that the second line section is not free of track-bound vehicles, it is possible on one hand for the lineside device to transmit corresponding status information again in this case. This information is therefore available to the track-bound vehicle, whereby the latter is additionally made aware that in the current situation that part of the first line section which lies between the lineside device and the second line section cannot be identified as being free of other track-bound vehicles. On the other hand, it is also possible in the event that the second line section is occupied for no corresponding status information to be transmitted by the lineside device, for example. The track-bound vehicle therefore receives no information in this case, or only information which contains no status information relating to the occupancy state of the second line section.

The method according to the invention can essentially be used in connection with track-bound traffic systems of any type. An appropriate traffic system in this case can preferably be in particular a railway system that is operated by means of a CBTC system.

In the context of the method according to the invention, the lineside device in principle can be a lineside device of any type. Of importance here is solely that the transfer of the status information is effected by the lineside device at the location of the lineside device. This means that it must be ensured by suitable technical measures that the status information cannot already be received by the track-bound vehicle at a distance before the lineside device, which could result in another track-bound vehicle "fitting" into the region between the track-bound vehicle and the end of the first line section or the beginning of the second line section. Taking this aspect into consideration, the lineside device can be e.g. a track coupling coil, a transponder in the form of e.g. an RFID tag, or even a short-range radio transmitter. In the latter case, depending on the respective conditions, the corresponding radio transmitter can be embodied in such a way that it has a range in the order of only one meter or a few meters, for example. The corresponding range must be taken into consideration when positioning the lineside device in the form of the radio transmitter, in order to guarantee that when the status information is received by the track-bound vehicle, the distance of the track-bound vehicle from the second line section is always dimensioned such that no other track-bound vehicle fits into that part of the first line section which lies between the track-bound vehicle and the second line section.

According to a particularly preferred development of the inventive method, the status information is transmitted by a lineside device in the form of a balise. This is advantageous because balises are operationally proven and comparatively economical lineside devices for transferring information to a track-bound vehicle. Corresponding balises are used in both track-bound traffic systems for long-distance traffic, e.g. the European Train Control system (ETCS), and train control systems for short-distance traffic, e.g. metro systems.

According to a further preferred embodiment variant, the inventive method can be developed here in such a way that vacancy detection information relating to the second line section is transferred from a vacancy detection system encompassing at least the second line section to a lineside electronic unit, and the balise is instructed by the lineside electronic unit to transmit a telegram containing the status information if the second line section is free of track-bound vehicles according to the vacancy detection information. This embodiment variant of the inventive method is advantageous in that corresponding lineside electronic units (LEU) are also already known and are used in conjunction with so-called transparent data balises, which can transfer different telegrams under the control of the lineside electronic unit, e.g. in the ETCS. According to the invention, the balise is controlled by the lineside electronic unit in such a way that a telegram containing status information which characterizes the second line section as being free of track-bound vehicles is only transmitted if the second line section is free of track-bound vehicles according to the vacancy detection information. For this purpose, vacancy detection information relating to the second line section is transferred directly or indirectly from the vacancy detection system encompassing at least the second line section to the lineside electronic unit, which then uses this information in the form of the status information to control the balise.

According to a further preferred embodiment variant of the inventive method, the line sections of the vacancy detection system are formed by axle counters or track circuits. This is advantageous since axle counters and track circuits are conventional components of corresponding vacancy detection systems.

The inventive method can preferably also be designed in such a way that information to the effect that that part of the first line section which lies between the lineside device and the second line section has been identified as being free of other track-bound vehicles is sent from the track-bound vehicle to a lineside control device of the track-bound traffic system. This has the advantage that the relevant information can subsequently be used by the lineside control device in the course of operating the track-bound traffic system.

According to a further particularly preferred development of the inventive method, the information received from the track-bound vehicle is taken into consideration by the lineside control device for the purpose of controlling and/or safeguarding the track-bound vehicle. This is advantageous because more efficient operation of the track-bound vehicle and/or the track-bound traffic system can be achieved thereby.

According to a further particularly preferred embodiment variant of the inventive method, assuming a track-bound vehicle in the form of a rail vehicle, line sections in the form of track sections and a lineside control device in the form of a control device of a communication-based train control system, this can be effected in particular in such a way that the lineside control device establishes a movement authority for the track-bound vehicle and/or instructs the track-bound vehicle to switch into moving-block operation on the basis of the information received. This is advantageous because establishing a corresponding movement authority and/or switching or taking the track-bound vehicle into moving-block operation allows more efficient operation of the track-bound vehicle and therefore also of the track-bound traffic system as such.

As an alternative to the previously described embodiment variant, it is also possible for the lineside control device to send a movement authority relating to the second line section to the track-bound vehicle and for said movement authority to be extended to the first line section as soon as that part of the first line section which lies between the track-bound vehicle and the second line section has been identified as free of other track-bound vehicles.

The present invention further relates to a vehicle device for a track-bound vehicle of a track-bound traffic system.

With regard to the vehicle device, the object of the present invention is to specify a vehicle device for a track-bound vehicle of a track-bound traffic system, whereby it is possible in a way which is particularly efficient and can be realized with comparatively little expense to identify that that part of a first line section which lies between a track-bound vehicle and a second line section is free of other track-bound vehicles.

This object is inventively achieved by a vehicle device for a track-bound vehicle of a track-bound traffic system, said vehicle device having an on-board receive device for receiving status information characterizing the second line section as being free of track-bound vehicles from a lineside device at the location of the lineside device, this being located in a first line section at a distance from the adjacent second line section, wherein said distance is dimensioned such that when the status information is received by the track-bound vehicle, no other track-bound vehicle fits into that part of the first line section which lies between the track-bound vehicle and the second line section, and having an on-board control device for identifying that, on the basis of the received status information, that part of the first line section which lies between the track-bound vehicle and the second line section is free of other track-bound vehicles.

The advantages of the inventive vehicle device correspond essentially to those of the inventive method, and therefore reference is made to the corresponding explanations above in this regard.

The invention further relates to a control apparatus for a track-bound traffic system, comprising a vehicle device according to the invention and the lineside device, said lineside device being located in the first line section at a distance from the adjacent second line section, which distance is dimensioned such that when the status information is received by the track-bound vehicle, no other track-bound vehicle fits into that part of the first line section which lies between the track-bound vehicle and the second line section, and being designed to transmit the status information characterizing the second line section as being free of track-bound vehicles.

With regard to the advantages of the inventive control apparatus, reference is again made to the corresponding explanations relating to the inventive method. Moreover, the advantages of the preferred developments of the inventive control apparatus as stated below likewise correspond to those of the corresponding preferred development of the inventive method, and therefore reference is again made to the corresponding explanations above in this regard.

The inventive control apparatus can preferably be developed in such a way that the lineside device is a balise.

According to a further particularly preferred embodiment variant, the inventive control apparatus is designed in such a way that a lineside electronic unit is provided for receiving vacancy detection information relating to the second line section from a vacancy detection system encompassing at least the second line section, and the lineside electronic unit instructs the balise to transmit a telegram containing the status information if the second line section is free of track-bound vehicles according to the vacancy detection information.

In a preferred development of the inventive control apparatus, the line sections of the vacancy detection system are formed by axle counters or track circuits.

The inventive control apparatus can preferably also be designed in such a way that a lineside control device of the track-bound traffic system is provided and the vehicle device is designed to send information to the lineside control device to the effect that that part of the first line section which lies between the lineside device and the second line section has been identified as being free of other track-bound vehicles.

According to a further particularly preferred embodiment variant of the inventive control apparatus, the lineside control device is designed to take the information received from the vehicle device into consideration for the purpose of controlling and/or safeguarding the track-bound vehicle.

The inventive control apparatus can preferably also be developed in such a way that, assuming a track-bound vehicle in the form of a rail vehicle, line sections in the form of track sections and a lineside control device in the form of a control device of a communication-based train control system, the lineside control device is designed to establish a movement authority for the track-bound vehicle and/or to instruct the track-bound vehicle to switch into moving-block operation on the basis of the information received.

The invention further relates to a track-bound traffic system which comprises both a control apparatus according to the invention, or a control apparatus according to one of the previously described preferred developments of the inventive control apparatus, and the track-bound vehicle.

BRIEF DESCRIPTION OF THE SEVERAL VIEWS OF THE DRAWING

The invention is explained in greater detail below with reference to exemplary embodiments. In a schematic diagram to illustrate an exemplary embodiment of the method according to the invention, the FIGURE shows an exemplary embodiment of a track-bound traffic system according to the invention, comprising an exemplary embodiment of the vehicle device according to the invention and an exemplary embodiment of the control apparatus according to the invention.

DESCRIPTION OF THE INVENTION

A track-bound traffic system 1 can be seen in the FIGURE. This comprises a line 10 which is designed as a track in the context of the present exemplary embodiment. This means that the track-bound traffic system 1 is a railway system in the context of the exemplary embodiment.

The line 10 is divided into a first line section 11 and a second line section 12, both line sections 11, 12 being delimited by wheel sensors or axle counters 21, 22 and 23. The axle counters 21, 22, 23 are part of a track vacancy detection system and are linked to vacancy detection equipment 24 in the context of this system. In this case, the function of the vacancy detection equipment 24 consists essentially in ascertaining a respective occupancy state of the line sections 11, 12 on the basis of signals or counter values sent from the axle counters 21, 22, 23 and supplying said occupancy state to supervisory systems, e.g. in the form of an interlocking system or a train control system.

A further lineside component shown in the FIGURE is a lineside device 30 in the form of a balise, this being linked to a lineside electronic unit 31. It is assumed in this case that the lineside electronic unit 31 is a component which is also referred to as LEU and that the lineside device 30 is a balise in the form of a transparent data balise.

Also shown in the FIGURE is a lineside control device 40 which is intended to represent a central control device of a train control system or automatic train protection system. The lineside control device 40 has a communication device 41 by means of which the lineside control device 40 can communicate with the track-bound vehicles running on the line 10. The lineside control device 40 is also linked to the vacancy detection equipment 24.

The FIGURE shows a track-bound vehicle 50 in a situation in which the track-bound vehicle 50 in the form of the rail vehicle is located in the first line section 11 and is moving towards the second line section 12 in a direction of travel 51.

The track-bound vehicle 50 has a vehicle device 52 comprising an on-board receive device 53 in the form of a balise antenna, an on-board control device 54 and an on-board communication device 55. In this case, the on-board control device 54 can be designed as e.g. a vehicle unit of a train control system. The on-board communication device 55 here allows the on-board control device 54 to transfer information to the lineside control device 40 and/or to receive corresponding information and driving instructions, e.g. in the form of a so-called "movement authority", from the lineside control device 40.

The lineside device 30, the lineside electronic unit 31, the lineside control device 40, the communication device 41, and the vehicle device 52 comprising the on-board receive device 53, the on-board control device 54 and the on-board communication device 55, together form a control apparatus 60.

According to the representation in the FIGURE, the track-bound vehicle 50 is situated at the location of the lineside device 30 to the effect that the on-board device 53 is located above the lineside device 30 in the form of the balise and therefore an information transfer from the lineside device 30 to the on-board receive device 53 is possible.

The lineside device 30 is located in the first line section 11 at a distance d from the second line section. The distance d in this case is dimensioned such that when the status information is received by the track-bound vehicle 50, no other track-bound vehicle fits into that part of the first line section 11 which lies between the track-bound vehicle 50 and the adjacent second line section 12. This is illustrated in the FIGURE by the depiction of a corresponding "virtual" vehicle 70, whereby it is evident that this vehicle 70, whose length preferably corresponds to the length of the shortest vehicle operated in the track-bound traffic system 1, would necessarily trigger an occupancy report in respect of the second line section 12 in the situation shown in the FIGURE. As a result of this, occupancy of the second line section 12 would therefore be identified and reported by the vacancy detection system or the vacancy detection equipment 24 thereof. It must be emphasized at this point that the representation in the FIGURE is merely a schematic diagram for the purpose of illustrating exemplary embodiments of the invention, and therefore lengths and distances in particular are not shown in proportion.

As shown in the FIGURE, the lineside electronic unit 31 is connected by technical communication means to the vacancy detection equipment 24. Therefore vacancy detection information relating to the second line section 12 is available to the lineside electronic unit 31 or is transferred from the vacancy detection system encompassing at least the second line section 12 to the lineside electronic unit 31.

On the basis of the relevant vacancy detection information, the lineside device 30 in the form of the balise is instructed by the lineside electronic unit 31 to transmit a telegram containing status information. Since no other track-bound vehicle is located in the second line section 12 according to the representation in the FIGURE, status information characterizing the second line section 12 as being free of track-bound vehicles is transmitted by the lineside device 30. This status information transmitted by the lineside device 30 is received at the location of the lineside device 30 by the track-bound vehicle 50 traversing the first line section 11 in the direction of the second line section 12. In this case, full advantage is taken of the fact that a transfer in a balise system only takes place in a region which is spatially close to the position of the balise. This ensures that the status information is essentially received by the on-board receive device 53 exclusively at the location of the lineside device 30, resulting in a localized transfer of status information. It is thereby guaranteed that the distance d between the track-bound vehicle 50 and the second line section 12 at the relevant instant is dimensioned such that when the status information is received by the track-bound vehicle 50, no other track-bound vehicle 70 fits into that part of the first line section 11 which lies between the track-bound vehicle 50 and the second line section 12. It is therefore possible to rule out the possibility that another track-bound vehicle is located in the region between the track-bound vehicle 50 and the axle counter 23 marking the beginning of the second line section 12. On the basis of the received status information, the track-bound vehicle 50 therefore identifies that (likewise) that part of the first line section 11 which lies between the lineside device 30 and the second line section 12 is free of other track-bound vehicles.

Information to the effect that that part of the first line section 11 which lies between the lineside device 30 and the second line section 12 has been identified as being free of other track-bound vehicles can subsequently be sent from the track-bound vehicle 50 to the lineside control device 40 of the track-bound traffic system 1. The information received from the track-bound vehicle 50 can then be taken into consideration by the lineside control device 40 for the purpose of controlling and/or safeguarding the track-bound vehicle 50. Assuming a track-bound vehicle 50 in the form of a rail vehicle, line sections 11, 12 in the form of track sections and a lineside control device 40 in the form of a control device of a communication-based train control system, this can mean in particular that the lineside control device 40 establishes a movement authority for the track-bound vehicle 50 and/or instructs the track-bound vehicle 50 to switch into moving-block operation on the basis of the information received. On the basis of the knowledge that no (other) track-bound vehicle is located in the region ahead of the track-bound vehicle 50 as viewed in the direction of travel 51, it is therefore possible to achieve a more efficient operation of the track-bound vehicle 50 and/or traffic system 1.

It should be noted that it is possible correspondingly to observe that part of the first line section which is situated behind the track-bound vehicle 50 as viewed in the direction of travel. In this case, the second line section would be connected on the left-hand side of the axle counter 21 and as a result of the method, that which lies between the rear end of the track-bound vehicle 50 and the axle counter 21 (or the second line section delimited thereby) would be identified as free of other track-bound vehicles.

If another track-bound vehicle is located in the second line section 12, i.e. contrary to the representation in FIG. 1, this information could also be sent to the track-bound vehicle 50 via the lineside electronic unit 31 and the lineside device 30. Therefore the track-bound vehicle 50 or the on-board control device 54 thereof has knowledge that in the present situation, in this case, it is not possible to indicate the occupancy state of that part of the first line section 11 which lies ahead of the track-bound vehicle 50 in the direction of travel 51. Alternatively, in the event that the second line section 12 is occupied by another track-bound vehicle, it is also conceivable for no corresponding status information to be sent from the lineside electronic unit 31 via the lineside device 30 to the track-bound vehicle 50.

As described in the foregoing explanations and the associated exemplary embodiments, the inventive method and the related apparatus make it possible to obtain a reliable indication of the occupancy of that part of the first track section 11 which lies ahead of and/or behind the track-bound vehicle 50 as viewed in the direction of travel 51. In practice, this is particularly important following a fault or when commencing operation of the track-bound vehicle 50 or the track-bound traffic system 1, as switching to normal operation can then be achieved as quickly as possible.

The invention claimed is:

1. A method for operating a track-bound traffic system, which comprises the steps of:
   transmitting, via a lineside device located in a first line section at a distance from an adjacent second line section, status information characterizing the second line section as being free of track-bound vehicles;
   receiving the status information transmitted by a track-bound vehicle traversing the first line section at a location of the lineside device, wherein the distance of the lineside device from the second line section is dimensioned such that when the status information is received by the track-bound vehicle, no other track-bound vehicle fits into that part of the first line section which lies between the track-bound vehicle and the second line section because the distance is so small that the other track-bound vehicle disposed in that part of the first line section would necessarily project into the second line section and would be detected as occupying the second line section; and
   determining, on a basis of the status information received and via the track-bound vehicle, that the part of the first line section which lies between the track-bound vehicle and the second line section is free of other track-bound vehicles.

2. The method according to claim 1, wherein the lineside device is a balise.

3. The method according to claim 2, which further comprises:
    transferring vacancy detection information relating to the second line section from a vacancy detection system encompassing at least the second line section to a lineside electronic unit; and
    instructing the balise, via the lineside electronic unit, to transmit a telegram containing the status information if the second line section is free of the track-bound vehicles according to the vacancy detection information.

4. The method according to claim 3, wherein the first and second line sections are part of the vacancy detection system and are defined by axle counters or track circuits.

5. The method according to claim 1, which further comprises sending information to an effect that the part of the first line section which lies between the track-bound vehicle and the second line section has been identified as being free of the other track-bound vehicles, from the track-bound vehicle to a lineside control device of the track-bound traffic system.

6. The method according to claim 5, wherein the information received from the track-bound vehicle is taken into consideration by the lineside control device for controlling and/or safeguarding the track-bound vehicle.

7. The method according to claim 5, wherein:
    the track-bound vehicle is a rail vehicle;
    the first and second line sections are track sections; and
    the lineside control device is a control device of a communication-based train control system, the lineside control device establishes a movement authority for the track-bound vehicle and/or instructs the track-bound vehicle to switch into moving-block operation on a basis of the information received.

8. A vehicle device for a track-bound vehicle of a track-bound traffic system, the vehicle device comprising:
    an on-board receiver for receiving status information characterizing a second line section as being free of track-bound vehicles from a lineside device at a location of the lineside device, the lineside device being disposed in a first line section at a distance from the second line section being adjacent to the first line section, wherein the distance is dimensioned such that when the status information is received by the track-bound vehicle, no other track-bound vehicle fits into that part of the first line section which lies between the track-bound vehicle and the second line section because the distance is so small that the other track-bound vehicle disposed in that part of the first line section would necessarily project into the second line section and would be detected as occupying the second line section; and
    an on-board controller for identifying, on a basis of the status information received, that the part of the first line section which lies between the track-bound vehicle and the second line section is free of other track-bound vehicles.

9. A control apparatus for a track-bound traffic system, the control apparatus comprising:
    a lineside device;
    a vehicle device, containing:
        an on-board receiver for receiving status information characterizing a second line section as being free of track-bound vehicles from said lineside device at a location of said lineside device, said lineside device being disposed in a first line section at a distance from the second line section being adjacent to the first line section, wherein the distance is dimensioned such that when the status information is received by a track-bound vehicle, no other track-bound vehicle fits into that part of the first line section which lies between the track-bound vehicle and the second line section because the distance is so small that the other track-bound vehicle disposed in that part of the first line section would necessarily project into the second line section and would be detected as occupying the second line section; and
        an on-board controller for identifying, on a basis of the status information received, that the part of the first line section which lies between the track-bound vehicle and the second line section is free of other track-bound vehicles; and
    said lineside device configured to transmit the status information characterizing the second line section as being free of the track-bound vehicles.

10. The control apparatus according to claim 9, wherein said lineside device is a balise.

11. The control apparatus according to claim 10, further comprising a lineside electronic unit for receiving vacancy detection information relating to the second line section being part of a vacancy detection system encompassing at least the second line section, said lineside electronic unit instructing said balise to transmit a telegram containing the status information if the second line section is free of the track-bound vehicles according to the vacancy detection information.

12. The control apparatus according to claim 11, wherein the first and second line sections are part of the vacancy detection system and said vacancy detection system has axle counters or track circuits for defining the first and second line sections.

13. The control apparatus according to claim 9,
    further comprising a lineside controller; and
    wherein said vehicle device is configured to send information to said lineside controller to an effect that the part of the first line section which lies between the track-bound vehicle and the second line section has been identified as being free of the other track-bound vehicles.

14. The control apparatus according to claim 13, wherein said lineside controller is configured to take the information received from said vehicle device into consideration for controlling and/or safeguarding the track-bound vehicle.

15. The control apparatus according to claim 13, wherein:
    the track-bound vehicle is a rail vehicle;
    the first and second line sections are track sections; and
    said lineside controller is a controller of a communication-based train control system, said lineside controller is configured to establish a movement authority for the track-bound vehicle and/or to instruct the track-bound vehicle to switch into moving-block operation on a basis of the status information received.

16. A track-bound traffic system, comprising:
    a track-bound vehicle; and
    a control apparatus according to claim 9.

* * * * *